(12) United States Patent
Crowell et al.

(10) Patent No.: US 8,176,355 B2
(45) Date of Patent: May 8, 2012

(54) RECOVERY FROM HARDWARE ACCESS ERRORS

(75) Inventors: Daniel M. Crowell, Rochester, MN (US); Alongkorn Kitamorn, Austin, TX (US); Kevin F. Reick, Round Rock, TX (US); Thi N. Tran, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1208 days.

(21) Appl. No.: 11/759,331

(22) Filed: Jun. 7, 2007

(65) Prior Publication Data
US 2008/0307287 A1 Dec. 11, 2008

(51) Int. Cl.
*G06F 11/00* (2006.01)
(52) U.S. Cl. ............................ 714/2; 714/758
(58) Field of Classification Search ................ 714/2
See application file for complete search history.

(56) References Cited

U.S. PATENT DOCUMENTS

| | | | | |
|---|---|---|---|---|
| 5,313,589 A * | 5/1994 | Donaldson et al. | 710/30 |
| 6,115,763 A * | 9/2000 | Douskey et al. | 710/72 |
| 6,314,486 B1 * | 11/2001 | Schulz et al. | 710/310 |
| 6,629,268 B1 * | 9/2003 | Arimilli et al. | 714/42 |
| 6,880,113 B2 * | 4/2005 | Anderson et al. | 714/45 |
| 7,266,727 B2 * | 9/2007 | Crowell et al. | 714/36 |
| 7,301,541 B2 * | 11/2007 | Hansen et al. | 345/522 |
| 7,424,666 B2 * | 9/2008 | Chandwani et al. | 714/799 |
| 7,519,871 B2 * | 4/2009 | Masser | 714/48 |
| 7,568,138 B2 * | 7/2009 | Martens et al. | 714/726 |
| 7,620,864 B2 * | 11/2009 | Elliott | 714/726 |
| 7,702,966 B2 * | 4/2010 | Chandwani et al. | 714/47.1 |
| 7,770,067 B2 * | 8/2010 | Lockwood et al. | 714/30 |
| 7,827,443 B2 * | 11/2010 | Eisen et al. | 714/10 |
| 2002/0124210 A1 * | 9/2002 | Fields et al. | 714/37 |
| 2002/0166083 A1 * | 11/2002 | Anderson et al. | 714/37 |
| 2003/0023932 A1 * | 1/2003 | Arndt et al. | 714/805 |
| 2003/0217256 A1 * | 11/2003 | Gilstrap et al. | 713/100 |
| 2004/0006729 A1 * | 1/2004 | Pendurkar | 714/733 |
| 2004/0210800 A1 * | 10/2004 | Vecoven et al. | 714/47 |
| 2004/0221198 A1 * | 11/2004 | Vecoven | 714/25 |
| 2005/0229042 A1 * | 10/2005 | Crowell et al. | 714/36 |
| 2005/0278284 A1 * | 12/2005 | Harvin et al. | 707/1 |
| 2006/0179207 A1 * | 8/2006 | Eisen et al. | 711/100 |
| 2007/0168719 A1 * | 7/2007 | Masser | 714/15 |
| 2008/0005706 A1 * | 1/2008 | Sharma et al. | 716/4 |
| 2008/0162882 A1 * | 7/2008 | Hansen et al. | 712/210 |
| 2008/0177986 A1 * | 7/2008 | Hansen et al. | 712/222 |
| 2008/0178048 A1 * | 7/2008 | Balazich et al. | 714/48 |
| 2008/0189512 A1 * | 8/2008 | Hansen et al. | 712/1 |
| 2009/0031105 A1 * | 1/2009 | Hansen et al. | 712/27 |
| 2009/0063898 A1 * | 3/2009 | Eisen et al. | 714/12 |

* cited by examiner

*Primary Examiner* — Scott Baderman
*Assistant Examiner* — Kamini Patel
(74) *Attorney, Agent, or Firm* — Stephen R. Tkacs; Stephen J. Walder, Jr.; Libby Z. Toub

(57) ABSTRACT

A mechanism is provided for recovering from a data scan error. A service processor determines the nature of the data scan error and, depending on the nature of the error, performs one of a plurality of data scan error recovery procedures.

20 Claims, 4 Drawing Sheets

US 8,176,355 B2

RECOVERY FROM HARDWARE ACCESS ERRORS

FIELD

The present invention is in the field of computer error recovery. More particularly, the invention relates to hardware scan error recovery.

BACKGROUND

Many different types of computing systems have attained widespread use around the world. These computing systems include personal computers, servers, mainframes, work stations, and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, web-publishing, databases, and accounting. Further, networks enable high speed communication between people in diverse locations by way of e-mail, websites, instant messaging, and web-conferencing.

At the heart of every computer, server, workstation and mainframe is at least one microprocessor. A common architecture for high performance, microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

In multi-processor systems, a service processor (SP) serves a central electronics complex (CEC) which contains multiple processors. The SP comprises firmware for operation of the processors in the CEC. More particularly, the SP has boot firmware and host firmware. The boot firmware runs on the SP. It boots the SP during Initial Program Load (IPL); causes the host firmware to load in the CEC; and then continues to run to monitor the hardware and to correct errors if errors occur. The host firmware runs on processors in the CEC and serves customer software applications. The host firmware is downloaded into RAM in the CEC and starts to run once the boot firmware completes the boot process.

The service processor also comprises a JTAG (Joint Test Action Group) engine. The JTAG engine is a device that provides a means to transfer data to and from its buffer to a designated chip in the CEC. Joint Test Action Group (JTAG) is the usual name used for the IEEE (Institute of Electrical and Electronics Engineers) 1149.1 standard entitled Standard Test Access Port and Boundary-Scan Architecture for test access ports used for testing printed circuit boards using boundary scan. JTAG was standardized in 1990 as the IEEE Std. 1149.1-1990. In 1994, a supplement that contains a description of the boundary scan description language (BSDL) was added. Since then, this standard has been adopted by electronics companies all over the world. While designed for printed circuit boards, JTAG is primarily used for testing sub-blocks of integrated circuits, and is also useful as a mechanism for debugging embedded systems, providing a convenient "back door" into the system. When used as a debugging tool, an in-circuit emulator which in turn uses JTAG as the transport mechanism enables a programmer to access an on-chip debug module which is integrated into a CPU (Central Processing Unit) via JTAG. The debug module enables the programmer to debug the software of an embedded system.

Thus, a JTAG engine is a device that provides a means to transfer data to or from a designated chip in the CEC of a multiprocessor system. Suppose, for example, one desires to transfer data to a chip in the CEC. The firmware running on the SP will define the data and send it to a buffer in the JTAG engine. The JTAG engine will shift this data into the chip. The reverse is true for transferring data from a chip.

Today, computer systems with high availability requirements use various error detection logic methods to ensure customer data integrity. When an error occurs in the system, it is reported to the Service Processor by way of an interrupt for further error analysis and fault isolation, so the a correct hardware part replacement can be determined. For a critical system error, the Service Processor extracts additional hardware state data by way of a "dump" process, then reboots the system as part of the overall system recovery. For a non-critical system error or event, the Service Processor performs analysis and assists in error recovery where applicable. The communication between the Service Processor and the system hardware is via a "Service Bus" (or JTAG) and a Scan engine. When a hardware error occurs in either the JTAG service bus or the Scan engine, the Service Processor loses the ability to analyze and determine the criticality of the real system error or event when it is reported to the Service Processor. To ensure maximum customer data integrity, the Service Processor treats the JTAG service bus or Scan engine error as a system critical error by extracting additional hardware state data by way of a "dump" process, then reboots the system to clear/reset all errors.

The drawbacks of the current design are that the system hardware error or event that reported to the Service Processor can also be a recoverable error or other non-system critical even, in addition to a critical error. When the Service Processor loses the ability to access the hardware to determine the reason for an interrupt, the Service Processor assumes the worst case, thus minimizing system availability in order to maximize customer data integrity.

What is needed is a recovery method to overcome an intermittent or transient JTAG service bus or scan engine error, so that the SP can continue with analyzing the actual error and determine the correct error criticality.

SUMMARY

The problems identified above are in large part addressed by systems, methods and media for data scan error recovery. One embodiment is a method to recover from a data scan error comprising performing a data scan and determining if a data scan error occurs. The method further comprises determining if the data scan error is an SCOM (Scan Communication) attention error or a CRC (Cyclic Redundancy Check) error or Invalid Instruction/Parity error. If the data scan error is an SCOM attention error, then the method comprises performing an SCOM attention error recovery procedure. If the data scan error is a CRC error or Invalid instruction/parity error, then the method comprises performing a CRC/Invalid Instruction/Parity error recovery procedure. The method may further comprise retrying the data scan once a data scan error recovery procedure is performed, and may further comprise determining if a data scan error recovery procedure can be performed safely.

Embodiments include a computer configurable to perform data scan error recovery, comprising memory to store instructions to perform data scan error recovery. The computer further comprises a processor coupled with the memory to execute instructions stored in the memory to perform an SCOM attention error recovery procedure in the event of an SCOM attention error, and to perform a CRC/Invalid Instruction/Parity error recovery procedure in the event of a CRC error, Invalid Instruction error or parity error.

Another embodiment of the invention provides a machine-accessible medium containing instructions effective, when executing in a data processing system, to cause the system to perform a series of operations for data scan error recovery. The series of operations comprise performing a data scan and determining if a data scan error has occurred, and determining the type of data scan error, if one occurs. If the data scan error is an SCOM attention error, the operations comprise performing an SCOM attention error recovery procedure. If the data scan error is a CRC error, and Invalid Instruction error, or Parity error, then the operations comprise performing a CRC/Invalid Instruction/Parity error recovery procedure.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods and media for recovering from a data scan error are disclosed. In one embodiment, a service processor determines the nature of the data scan error and, depending on the nature of the error, performs one of a plurality of data scan error recovery procedures.

Figure 1:
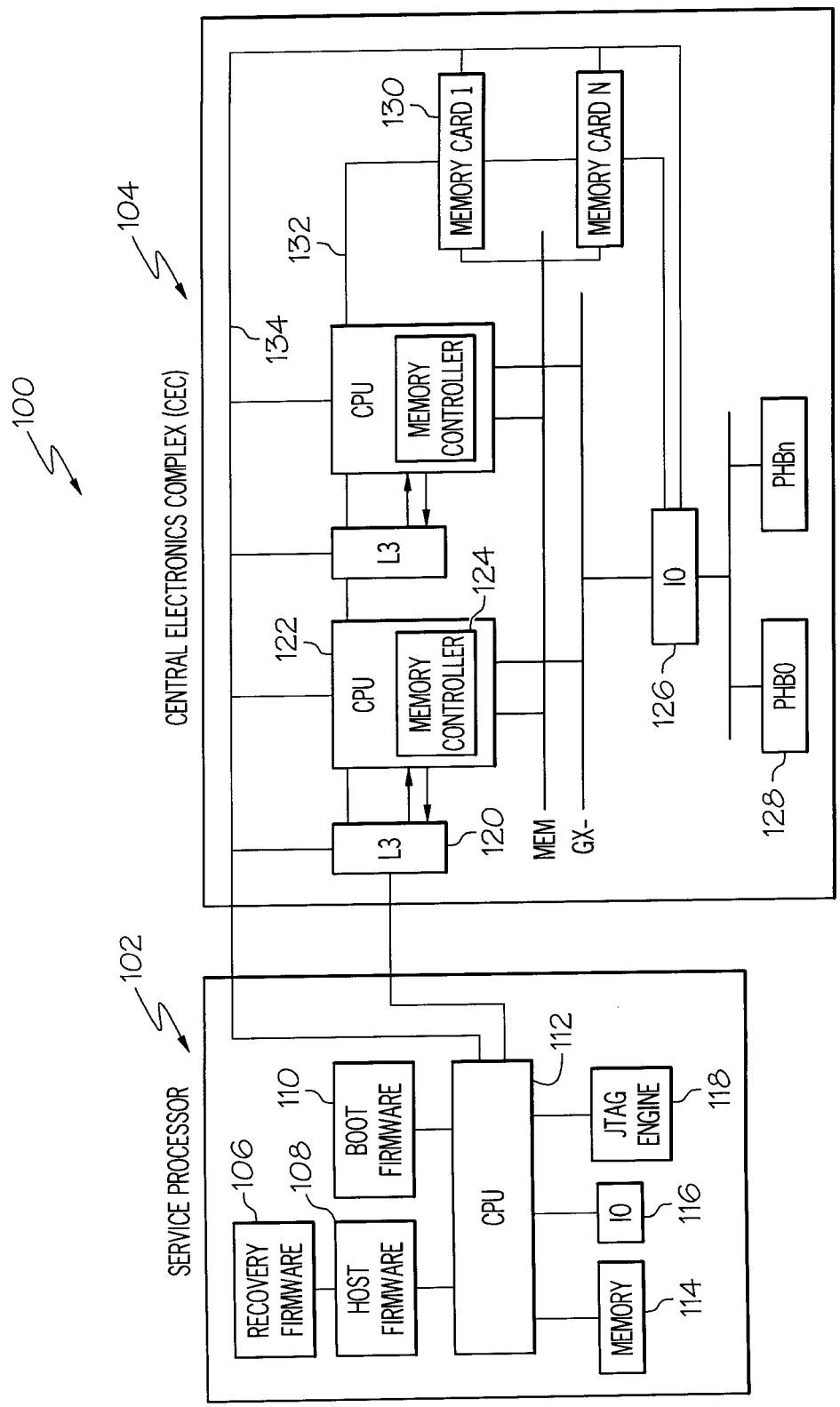
FIG. 1 depicts an embodiment of a digital system within a service processor and central electronics complex.

FIG. 1 shows a digital system 100 comprising a Service Processor (SP) 102 and a Central Electronics Complex (CEC) 104. SP 102 comprises Scan Error Recovery Firmware 106, Host Firmware 108, and Boot Firmware 110. Recovery Firmware 106 comprises computer code to implement a recovery process for recovering from a data scan error. Boot firmware 110 runs on the Central Processing Unit (CPU) 112 of SP 102. It boots the SP during Initial Program Load (IPL); causes the host firmware to load in CEC 104; and then continues to run to monitor the hardware and to correct errors if errors occur. Host firmware 108 runs on processors 122 in CEC 104 and serves customer software applications. The host firmware is downloaded into memory 130 in the CEC and starts to run once the boot firmware completes the boot process. SP 102 also comprises memory 114, an Input/Output (IO) control mechanism 116, and a JTAG scan engine 118.

JTAG engine 118 communicates with CPU 112 to effectuate the transfer of data and signals from SP 102 to chips of the CEC 104. Chips of CEC 104 comprise cache L3 (120) CPUs 122 with memory controller 124, and also comprises an IO controller 126, PHB (Peripheral Component Interconnect Host Bridge) 128 and memory cards 130. In most IC's today, chips comprise internal registers that are on a scan chain. This allows all combinatorial logic to be tested completely even while an IC is in the circuit card and possibly while in a functioning system. When combined with Built in Self Tests (BIST), the JTAG scan chain enables a low overhead, completely embedded solution to testing an IC for certain static faults (shorts, opens, and logic errors). The scan chain mechanism does not generally help diagnose or test for timing, temperature or other dynamic operational errors that may occur. Thus, the chips of CEC 104 are connected in a chain by a JTAG service bus 132, which carries signals and data back to CPU 112 of SP 102. The chips of the CEC are also connected by an (Signal Communications) SCOM attention bus 134 to the CPU of the SP.

A JTAG interface is a special four or five pin interface added to a chip, designed so that multiple chips on a board can have their JTAG lines daisy-chained together, and a test line need only connect to a single "JTAG port" to have access to all chips on a circuit board. The connector pins of a JTAG port are
1. TDI (Test Data In)
2. TDO (Test Data Out)
3. TCK (Test Clock)
4. TMS (Test Mode Select)
5. TRST (Test ReSeT) optional.

Figure 1A:
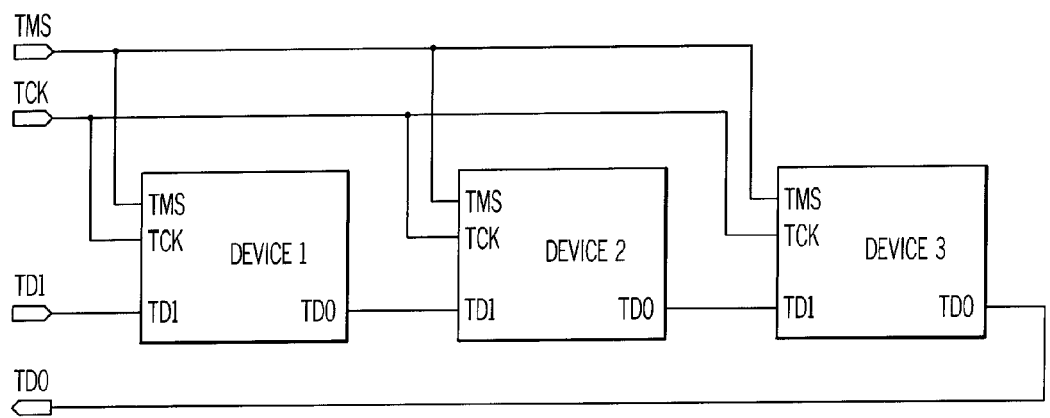
FIG. 1A depicts a block diagram of a JTAG service bus connecting multiple devices.

These pins and their connections are shown for a chain of devices 1, 2, and 3 in FIG. 1A. They give access to and control of a chip's SCOM (signal communications) engine and SCAN engine. A chip's SCAN engine is similar to a JTAG engine, but resides in the chip at the other end of the data transfer operation. It provides a means for the chip to receive the data transferred from a JTAG engine. In the case of a read, it will shift the data from the chip out to the JTAG engine, which is then read by the firmware once the data is placed in the JTAG engine buffer. The SCOM engine is similar to the SCAN engine, but requires the chip's clock in order to scan data to or there from.

Since only one data line is available, the communications protocol is necessarily serial. The clock input is at the TCK pin. Configuration is performed by manipulating a state machine one bit at a time through a TMS pin. One bit of data is transferred in and out per TCK clock pulse at the TDI and TDO pins, respectively. Different instruction modes can be loaded to read the chip ID, sample input pins, drive (or float) output pins, manipulate chip functions, or bypass (pipe TDI to TDO to logically shorten chains of multiple chips). The operating frequency of TCK varies depending on the chip, but it is typically 10-100 MHz (100-10 ns per bit). When performing boundary scan on integrated circuits, the signals manipulated are between different functional blocks of the chip, rather than between different chips. The TRST pin is an optional active-low reset to the test logic—usually asynchronous, but sometimes synchronous, depending on the chip. If the pin is not available, the test logic can be reset by clocking in a reset instruction synchronously.

Devices communicate to the world via a set of I/O pins. By themselves, these pins provide limited visibility into the workings of the device. However, devices that support boundary scan contain a shift-register cell for each signal pin of the device. These registers are connected in a dedicated path around the device's boundary (hence the name), as shown in FIG. 1. The path creates a virtual access capability that circumvents the normal inputs and provides direct control of the device and detailed visibility at its outputs. During testing, I/O signals enter and leave the chip through the boundary-scan cells. The boundary-scan cells can be configured to support external testing for interconnection between chips or internal testing for logic within the chip. To provide the boundary scan capability, IC vendors add additional logic to each of their devices, including scan registers for each of the signal pins, a dedicated scan path connecting these registers, four or five additional pins, and control circuitry. The overhead for this additional logic is minimal and generally well worth the price to have efficient testing at the board level.

Normally, when an error in a chip in CEC 104 occurs, an attention signal is sent by way of Attention signal line 134 to CPU 112. CPU 112, executing host firmware 108, determines the error by reading by way of JTAG engine 118, data from the suspect chip to determine the error. However, it may occur that the underlying error is obscured by a data scan error, i.e., an error in the JTAG scan process itself. When this occurs, a data scan error recovery process is preferred that avoids reboot of the system before the underlying error is determined. Accordingly, SP 102 executes data scan error recovery firmware 106 to recover from a data scan error so that the underlying error can be determined. Thus, the system overcomes the current design limitation in the event of a JTAG service bus error. A recovery method described herein overcomes an intermittent or transient data scan error so that the SP can continue with analyzing the actual system hardware error that prompted the scan.

Embodiments thus may improve system availability without risking customer data integrity. Embodiments perform a recovery and retry procedure on the chip in question immediately after a data scan error occurs. The recovery sequence gets the chip scan engine out of the erroneous state and retrieves the underlying data indicative of the underlying error without rebooting the system. The recovery sequence is transparent to the client that requests the data scan.

Figure 1B:
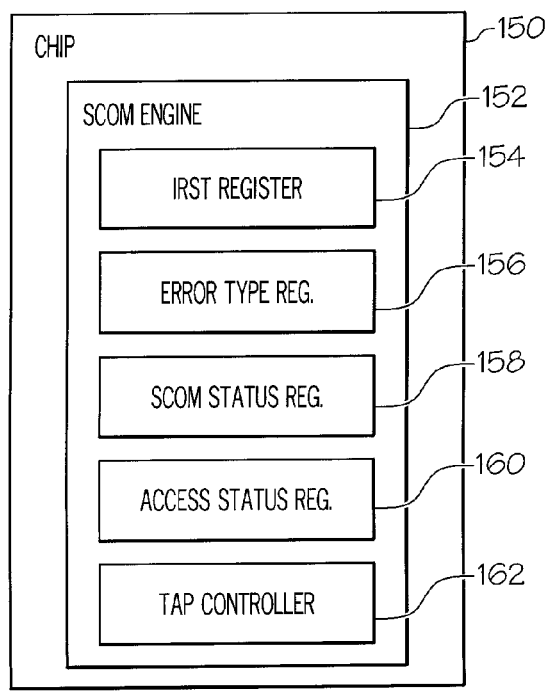
FIG. 1B depicts a block diagram of a chip with an SCOM engine.

FIG. 1B shows a standard chip that may be scanned using a JTAG scan engine. The chip 150 comprises an SCOM engine 152. The SCOM engine comprises an Instruction Register Status (IRST) register 154, an error type register 156, an SCOM status register 158, an access status register 160 and a Test Access Port (TAP) controller 162. A data scan error is reflected by the state of an Instruction Register Status (IRST) register 154 of a chip in CEC 104. For example, the following error states may be reflected in the IRST register:

SCOM (Scan Communication) Attention (bit #4)

CRC (Cyclical Redundancy Check) Microcompare (bit #5)

Invalid Instruction/Parity (bit #6)

Last bits are not '01'

Upon completion of a data scan, the recovery firmware 106 always checks the IRST register for one of these error conditions. If an error is detected, the recovery firmware 106 will perform a sequence of recovery steps as follows:

1. Determine if it is safe to perform the recovery on the chip; it might not be safe if, for example, a chip does not support the recovery procedures described herein, or for example if a type of data scan error precludes performance of a data scan error recovery procedure
2. If it is safe to perform the recovery, then for an SCOM attention error:
   a) Unlock the SCOM engine 152 by writing 0xB000000 to the chip
   b) Write 0x00000000 to SCOM register 0x600100 to clear error type
   c) Clear the idle bit (bit #4) of the SCOM Status register 158 (address 0x000080)
   d) Write 0x00000000 to Access Status register 160 (address 0x000002)
   e) Reset the TAP (Test Access Port) controller 162 by sending BYPASS command 0x03000000
3. If it is safe to perform the recovery, then for a CRC miscompare or Invalid Instruction/Parity error:
   a) Reset the TAP controller by sending command 0x03000000
   b) Clear the error by writing 0x00000000 to the Access Status Register (Ring 0x000002)
4. The chip should now be out of its erroneous state: the data scan is then retried.
5. If the retried data scan is successful, data will be sent back to the CPU 112, in order to determine the underlying error that resulted in the scan.
6. If the error persists, it means the chip or system has encountered a fatal error, requiring engineering service.

Figure 2:
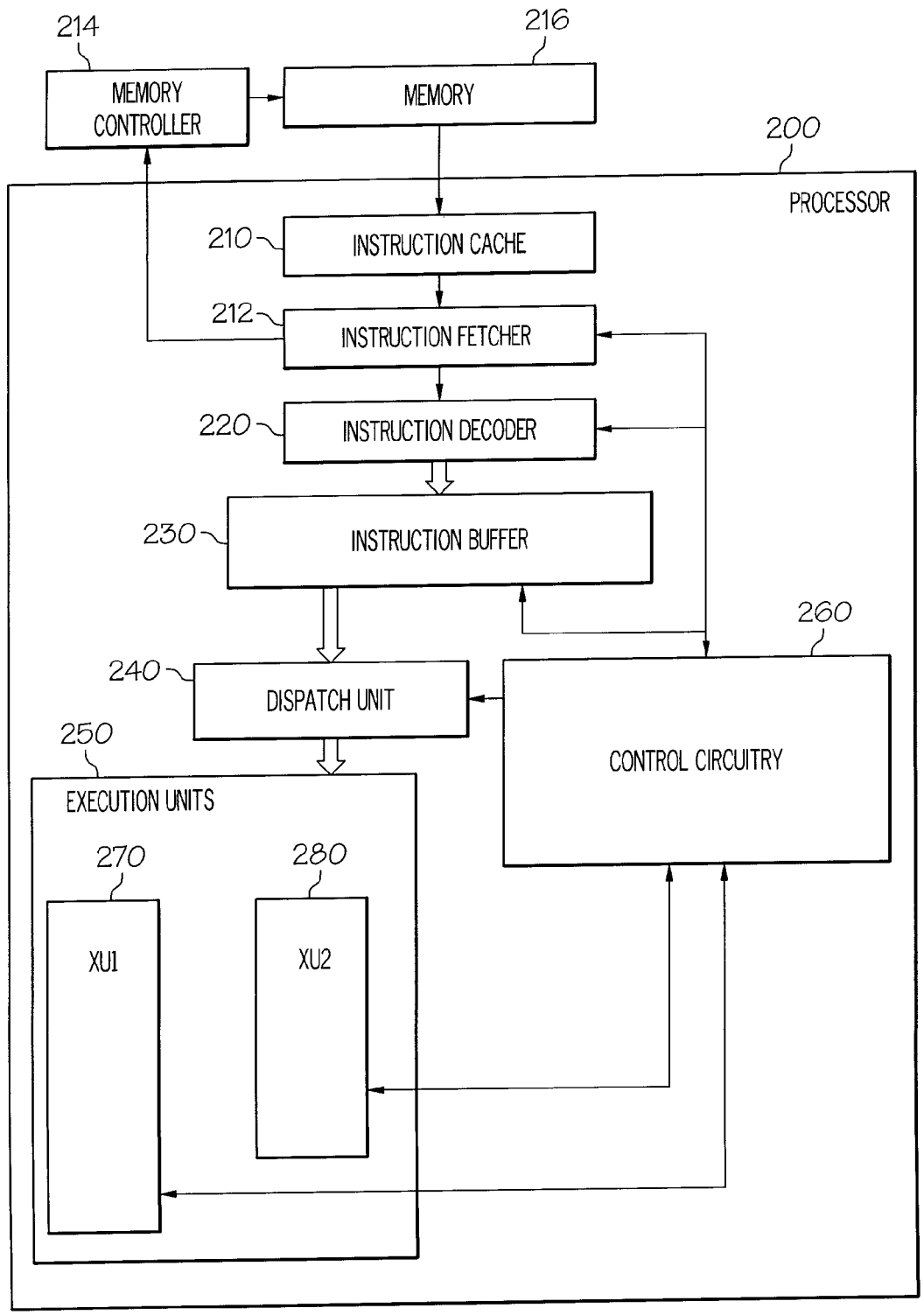
FIG. 2 depicts an embodiment of a processor within a computer that may execute data scan error recovery procedures.

FIG. 2 shows an embodiment of a CPU 200 that can be implemented in a Service Processor such as Service Processor 102, to execute data scan error recovery software as described herein. The processor 200 of FIG. 2 is configured to execute instructions for data scan error recovery as detailed in the flow chart 300 of FIG. 3. A level 1 instruction cache 210 receives instructions from memory 216 external to the processor, such as level 2 cache. Thus, software for data scan error recovery may be stored in memory as firmware. Groups of sequential instructions of the software can be transferred to the L2 cache, and subgroups of these instructions can be transferred to the L1 cache.

An instruction fetcher 212 maintains a program counter and fetches software instructions from L1 instruction cache 210. The program counter of instruction fetcher 212 comprises an address of a next instruction to be executed. Instruction fetcher 212 also performs pre-fetch operations. Thus, instruction fetcher 212 communicates with a memory controller 214 to initiate a transfer of software update instructions from a memory 216 to instruction cache 210. The place in the cache to where an instruction is transferred from system memory 216 is determined by an index obtained from the system memory address.

Sequences of instructions are transferred from system memory 216 to instruction cache 210 to implement data scan error recovery functions. Thus, instruction fetcher 212 retrieves data scan error recovery instructions passed to instruction cache 210 and passes them to an instruction decoder 220. Instruction decoder 220 receives and decodes the instructions fetched by instruction fetcher 212. Instruction buffer 230 receives the decoded instructions from instruction decoder 220. Instruction buffer 230 comprises memory locations for a plurality of instructions. Instruction buffer 230 may reorder the order of execution of instructions received from instruction decoder 220. Instruction buffer 230 therefore comprises an instruction queue to provide an order in which instructions are sent to a dispatch unit 240.

Dispatch unit 240 dispatches communications processing instructions received from instruction buffer 230 to execution units 250. In a superscalar architecture, execution units 250 may comprise load/store units, integer Arithmetic/Logic Units, floating point Arithmetic/Logic Units, and Graphical Logic Units, all operating in parallel. Dispatch unit 240 therefore dispatches instructions to some or all of the executions units to execute the instructions simultaneously. Execution units 250 comprise stages to perform steps in the execution of instructions received from dispatch unit 240. Data processed by execution units 250 are storable in and accessible from integer register files and floating point register files not shown. Thus, instructions are executed sequentially and in parallel.

FIG. 2 shows a first execution unit (XU1) 270 and a second execution unit (XU2) 280 of a processor with a plurality of execution units. Each stage of each of execution units 250 is capable of performing a step in the execution of a different data scan error recovery instruction. In each cycle of operation of processor 200, execution of an instruction progresses to the next stage through the processor pipeline within execution units 250. Those skilled in the art will recognize that the stages of a processor "pipeline" may include other stages and circuitry not shown in FIG. 2.

Moreover, by multi-thread processing, multiple software update processes may run concurrently. For example, by executing instructions of different threads, the processor executes load/store instructions while also performing an exclusive-or of data. Thus, a plurality of instructions may be executed in sequence and in parallel to perform encrypted software update functions.

FIG. 2 also shows control circuitry 260 to perform a variety of functions that control the operation of processor 200. For example, an operation controller within control circuitry 260 interprets the OPCode contained in an instruction and directs the appropriate execution unit to perform the indicated operation. Also, control circuitry 260 may comprise a branch redirect unit to redirect instruction fetcher 212 when a branch is determined to have been mispredicted. Control circuitry 260 may further comprise a flush controller to flush instructions younger than a mispredicted branch instruction.

Thus, some embodiments comprise a computer configurable to perform data scan error recovery. The computer comprises memory to store instructions to perform data scan error recovery. The computer also comprises a processor coupled with the memory to execute instructions stored in the memory. The instructions cause the processor to perform an SCOM attention error recovery procedure in the event of an SCOM attention error, and to perform a CRC/Invalid Instruction/Parity error recovery procedure in the event of a CRC error, Invalid Instruction error or parity error. The computer may further be configured to retry a data scan after a data scan error recovery procedure has been completed. The computer may be further configured to remedy an underlying error after a data scan error recovery procedure has been completed. To perform an SCOM attention error recovery procedure the computer will perform steps comprising: unlocking an SCOM engine; clearing an error type register; clearing an idle bit of an SCOM status register; resetting an access status register; and resetting a TAP controller. To perform a CRC/Invalid Instruction/Parity error recovery procedure the computer will perform steps comprising: resetting an access status register; and resetting a TAP controller.

Therefore, embodiments provide a way to recover from a data scan error which avoids treating the error as a fatal one.

Figure 3:
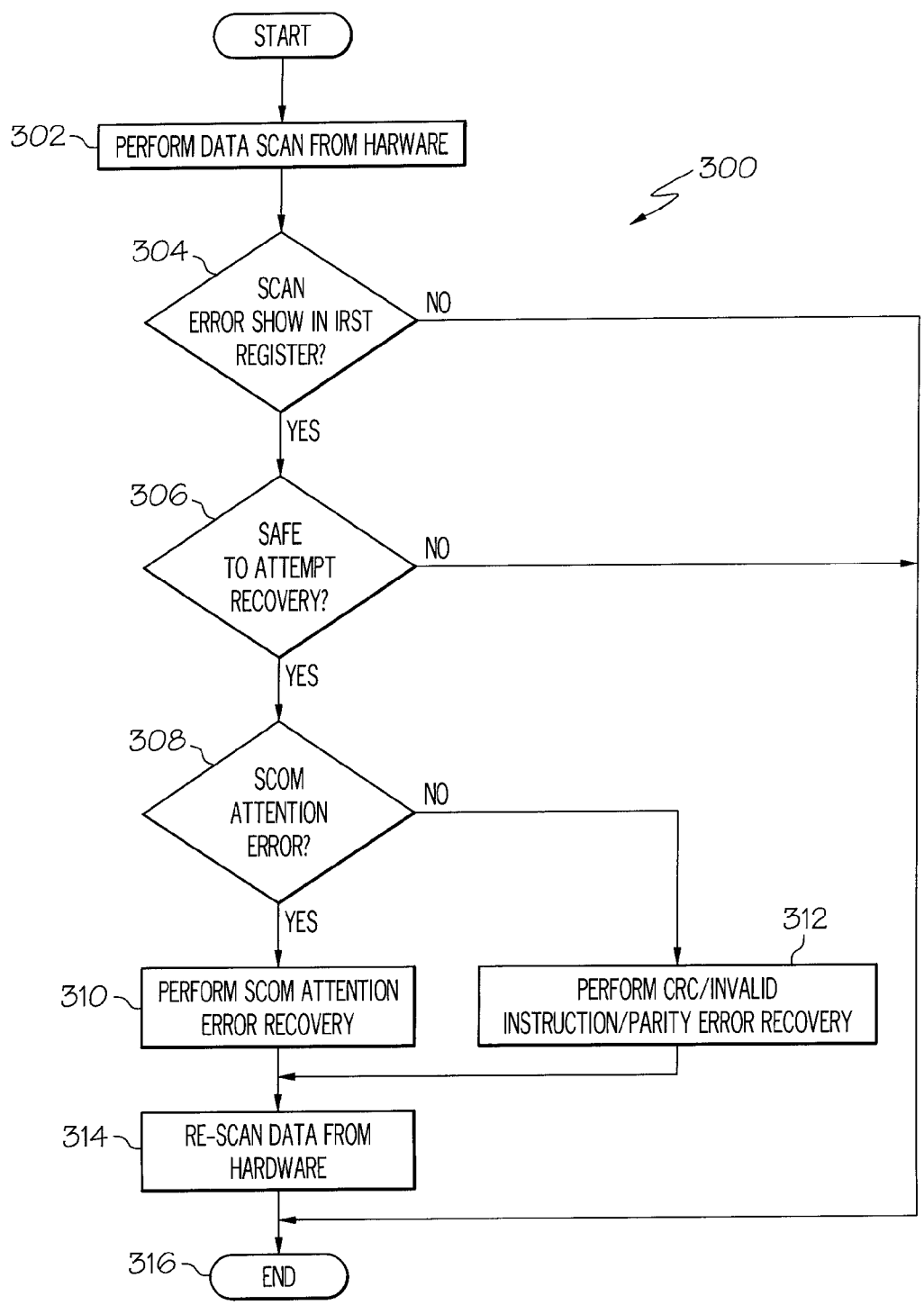
FIG. 3 depicts a flowchart of an embodiment for performing data scan error recovery.

FIG. 3 shows a flow chart 300 of an embodiment for recovery from a data scan error. In a first step, the SP performs a data scan of hardware in the CEC, (element 302). The system determines if there is a data scan error, and if so, the nature of the error (element 304). Thus, the system distinguishes between an SCOM attention error and a CRC error or Invalid Instruction/Parity error by reading the bits of the Instruction Register Status (IRST) register of the SCOM engine of the chip. If there is no data scan error, the data scan error recovery process is terminated, (element 316) and the system proceeds to determine the underlying error for which the data scan was conducted.

If a data scan error is detected, (element 304), by reading the bits of the IRST register, the SP determines if it is safe to perform data scan error recovery on the chip (element 306). If it is not safe, then the scan recovery process terminates (element 316) and the system performs recovery as if the underlying error is fatal. If it is safe to perform data scan error recovery (element 306), the system determines if the error is an SCOM attention error (element 308). If not, the system performs a data scan error recovery for a CRC/Invalid Instruction/Parity error (element 312). Otherwise, the system performs a data scan error recovery for an SCOM attention error (element 310). Once data scan error recovery is completed, the SP rescans the data to determine the underlying error which caused the original data scan (element 314). Then, the data scan error recovery process terminates (element 316) and the system treats the underlying hardware error.

Some embodiments of the invention are implemented as a program product for use with a computer system such as, for example, the system shown in FIG. 1. The program product could be used on other computer systems or processors. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Thus, another embodiment of the invention provides a machine-accessible medium containing instructions effective, when executing in a data processing system, to cause the system to perform a series of operations for recovery from a data scan error. The operations comprise performing a data scan and determining if a data scan error has occurred and determining the type of data scan error, if one occurs. If the data scan error is an SCOM attention error, the operations comprise performing an SCOM attention error recovery procedure. If the data scan error is a CRC error, and Invalid Instruction error, or Parity error, then the operations comprise performing a CRC/Invalid Instruction/Parity error recovery procedure. The operations may further comprise retrying a data scan after a data scan error recovery procedure has been completed. Also, the operations may further comprise remedying an underlying error after a data scan error recovery procedure has been completed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to recover from a data scan error, comprising:
    performing, by a service processor, a data scan on hardware in a central electronics complex, wherein responsive to the data scan resulting in a data scan error, a scan communication (SCOM) engine writes a data scan error type to an instruction register status (IRST) register;
    responsive to the data scan resulting in a data scan error, determining a type of the data scan error based on the IRST register;
    in response to the IRST register indicating the data scan error is an SCOM attention error, performing an SCOM attention error recovery procedure; and
    in response to the IRST register indicating the data scan error is a CRC error or Invalid Instruction/Parity error, performing a CRC/Invalid Instruction/Parity error recovery procedure.

2. The method of claim 1, further comprising retrying the data scan responsive to a data scan error recovery procedure being performed.

3. The method of claim 1, further comprising determining if a type of data scan error precludes performance of a data scan error recovery procedure.

4. The method of claim 1, wherein the SCOM attention error recovery procedure comprises:
    unlocking an SCOM engine;
    clearing an error type register;
    clearing an idle bit of an SCOM status register;
    resetting an access status register; and
    resetting a TAP controller.

5. The method of claim 4, wherein unlocking the SCOM engine comprises writing 0x1b000000 to a chip comprising the SCOM engine.

6. The method of claim 4, wherein clearing the error type register comprises writing 0x600100 to the error type register.

7. The method of claim 4, wherein resetting the access status register comprises writing 0x00000000 to the access status register.

8. The method of claim 4, wherein resetting the TAP controller comprises sending a BYPASS command 0x03000000.

9. The method of claim 1, wherein the CRC/Invalid Instruction/Parity error recovery procedure comprises:
    resetting an access status register; and
    resetting a TAP controller.

10. A computer configurable to perform data scan error recovery, comprising:
    memory to store instructions to perform data scan error recovery; and
    a service processor coupled with the memory to execute instructions stored in the memory, wherein the instructions, when executed by the service processor, cause the service processor to:
    perform a data scan on hardware in a central electronics complex, wherein responsive to the data scan resulting in a data scan error, a scan communication (SCOM) engine writes a data scan error type to an instruction register status (IRST) register;
    responsive to the data scan resulting in a data scan error, determine a type of the data scan error based on the IRST register;
    responsive to the IRST register indicating the data scan error is an SCOM attention error, perform an SCOM attention error recovery procedure; and
    responsive to the IRST register indicating the data scan error is a CRC/Invalid Instruction/parity error, perform a CRC/Invalid Instruction/parity error recovery procedure.

11. The computer of claim 10, wherein the instructions executed by the service processor further comprise instructions to retry a data scan responsive to a data scan error recovery procedure having been completed.

12. The computer of claim 10, wherein the instructions executed by the service processor further comprise instructions to remedy an underlying error responsive to a data scan error recovery procedure having been completed.

13. The computer of claim 10, wherein the instructions executed by the service processor further comprise instructions to determine if a type of data scan error precludes performance of a data scan recovery procedure.

14. The computer of claim 10, wherein the instructions to perform an SCOM attention error recovery procedure comprise instructions to:
    unlock an SCOM engine;
    clear an error type register;
    clear an idle bit of an SCOM status register;
    reset an access status register; and
    reset a TAP controller.

15. The computer of claim 10, wherein the instructions to perform a CRC/Invalid Instruction/Parity error recovery procedure comprise instructions to:
    reset an access status register; and
    reset a TAP controller.

16. A storage medium containing instructions for updating a computer program, which, when the instructions are executed by a machine, cause said machine to perform operations, comprising:

performing, by a service processor, a data scan on hardware in a central electronics complex, wherein responsive to the data scan resulting in a data scan error, a scan communication (SCOM) engine writes a data scan error type to an instruction register status (IRST) register;

responsive to the data scan resulting in a data scan error, determining a type of the data scan error based on the IRST register;

in response to the IRST register indicating the data scan error is an SCOM attention error, performing an SCOM attention error recovery procedure; and in response to the IRST register indicating the data scan error is a CRC error, an Invalid Instruction error, or Parity error, performing a CRC/Invalid Instruction/Parity error recovery procedure.

17. The storage medium of claim 16, wherein the operations further comprise retrying a data scan responsive to a data scan error recovery procedure having been completed.

18. The storage medium of claim 16, wherein the operations further comprise remedying an underlying error responsive to a data scan error recovery procedure having been completed.

19. The storage medium of claim 16, wherein the operations for performing an SCOM error recovery procedure further comprise:
   unlocking an SCOM engine;
   clearing an error type register;
   clearing an idle bit of an SCOM status register;
   resetting an access status register; and
   resetting a TAP controller.

20. The storage medium of claim 16, wherein the operations for performing a CRC/Invalid Instruction/Parity error recovery procedure further comprise:
   resetting an access status register; and
   resetting a TAP controller.

* * * * *